United States Patent Office 3,429,963
Patented Feb. 25, 1969

3,429,963
DENTAL PREPARATION CONTAINING POLYMERIC POLYELECTROLYTE
Leo Shedlovsky, New York, N.Y., assignor to Colgate-Palmolive Company, New York, N.Y., a corporation of Delaware
No Drawing. Filed June 9, 1964, Ser. No. 373,867
U.S. Cl. 424—56    5 Claims
Int. Cl. A61c 15/00; A61k 7/16

This invention relates to preparations, and particularly to dental preparations, comprising certain polyelectrolytes.

According to the present invention, improved compositions are prepared by the incorporation of a substantially linear, polymeric, water-soluble polyelectrolyte whose complexing with calcium is characterized by an apparent dissociation constant $(pK_{Ca})$ where $-\log K_{Ca}$ is of from about 2.2 to about 4.5. Typical of such polyelectrolytes are:

copolymers of an unsaturated polybasic carboxylic acid or anhydride thereof (preferably dibasic and having 4 carbon atoms per molecule) and of an olefin having 2 or more carbon atoms per molecule, or an olefinic ether having 3 or more carbon atoms per molecule;
polyolefin sulfonates;
polyolefin phosphonates, the olefin groups of which contain from 2 or more carbon atoms; and
polyolefin phosphates, the olefin groups of which contain 2 or more carbon atoms.

Individual polyelectrolytes serving to illustrate the invention include:

(a) A hydrolyzed copolymer of maleic anhydride and ethylene, having recurring groups

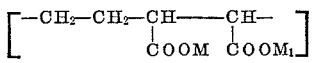

and average molecular weights of about 1,500 and greater; and wherein M and $M_1$ are hydrogen, sodium, potassium or ammonium, and wherein M and $M_1$ are the same or different.

(b) A hydrolyzed copolymer of maleic anhydride and styrene, having recurring groups

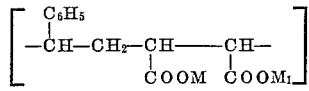

and average molecular weights of about 1,500 and greater; and wherein M and $M_1$ are hydrogen, sodium, potassium or ammonium, and wherein M and $M_1$ are the same or different.

(c) A hydrolyzed copolymer of maleic anhydride and isobutylene, having recurring groups

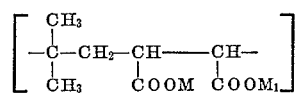

and average molecular weights of about 1,500 and greater; and wherein M and $M_1$ are hydrogen, sodium, potassium or ammonium, and wherein M and $M_1$ are the same or different.

(d) A hydrolyzed copolymer of maleic anhydride and polymethyl vinyl ether, having recurring groups

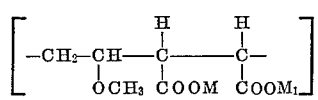

and average molecular weights of about 1,500 and greater; and wherein M and $M_1$ are hydrogen, sodium, potassium or ammonium, and wherein M and $M_1$ are the same or different.

(e) A hydrolyzed copolymer of maleic anhydride and polyethyl vinyl ether, having recurring groups

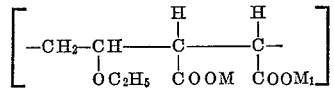

and average molecular weights of about 1,500 and greater; and wherein M and $M_1$ are hydrogen, sodium, potassium or ammonium, and wherein M and $M_1$ are the same or different.

(f) A polyacrylic acid, and polyacrylates thereof, having recurring groups

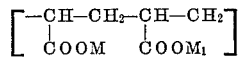

and average molecular weights of about 1,500 and greater; and wherein M and $M_1$ are hydrogen, sodium, potassium and ammonium, and wherein M and $M_1$ are the same or different.

(g) A polyitaconic acid, and polyitaconates thereof, having recurring groups

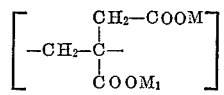

and average molecular weights of about 1,500 and greater; and wherein M and $M_1$ are hydrogen, sodium, potassium and ammonium, and wherein M and $M_1$ are the same or different.

(h) A polyolefin sulfonate, having recurring groups

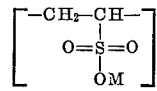

and average molecular weights of about 10,000 and greater; and wherein M is hydrogen, sodium, potassium or ammonium.

(i) A polyvinyl phosphonate, having recurring groups

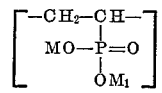

and average molecular weights of about 8,500 and greater; and wherein M and $M_1$ are hydrogen, sodium, potassium or ammonium, and wherein M and $M_1$ are the same or different, (j) A polyvinyl phosphate having recurring groups

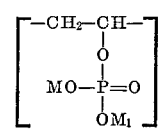

and average molecular weights of about 5,000 or greater; and wherein M and $M_1$ are hydrogen, sodium, potassium and ammonium, and wherein M and $M_1$ are the same or different.

Molecular weight values given for such polyelectrolytes are obtained from viscosity or light scattering measurements.

Methods for the preparation of the polyelectrolytes contemplated herein are well known in the art. By way of illustration, copolymers of ethylene or propylene and maleic anhydride are described in U.S. Patents Nos. 2,854,357 and 2,879,263; sodium maleate-vinyl acetate copolymer, in the text "Vinyl and Related Polymers" of C. E. Schildknecht (1952); polyacrylic acid, in "Textbook of Polymer Science" of F. W. Billmeyer (1962); sodium polyetyhlene sulfonate, Journal American Chemical Society 76, 5361 and 6399 (1954); soluble sodium salt of polyvinyl phosphate, Industrial and Engineering Chemistry 46, 1042 (1954); phosphonic polymers, Journal of Chemical Society (1956), page 4607. The copolymers can be hydrolyzed when agitated in water at about 90° C., or by subjecting the polymer anhydrides to the action of water vapor at 70–90% relative humidity at 50–90° C. for ½ hour to 10 hours.

It is to be understood that all of the polyelectrolytes mentioned above are not equivalent in the compositions of this invention, although all exhibit substantial effectiveness. For example, a sodium salt of a polyethylene sulfonate (average molecular weight, 250,000) is less effective in reducing oral calculus deposits at a pH of 8.0 than is the sodium salt of a hydrolyzed copolymer of ethylene and maleic anhydride (average molecular weight, 1,500). On a weight basis, more polyethylene sulfonate is required than of the hydrolyzed copolymer to effect removal of a given quantity of calculus deposits at such a pH value However, at lower pH values, of the order of 6–7, the hydrolyzed copolymer is less effective and about equal to the sodium salt of polyethylene sulfonate. Thus, the polyethylene sulfonate is not influenced by changes in pH; whereas, pH has a material effect on the hydrolyzed copolymer. In the presence of sodium chloride, effectiveness of the hydrolyzed copolymer is reduced, and a greater decrease is found with the sodium salt of the polyethylene sulfonate. Accordingly, it is advisable to minimize the content of sodium chloride and like salts in the compositions of this invention. In general, such salts should be present in quantities of less than about 0.5 percent by weight of the compositions.

The polyelectrolytes contemplated herein are particularly effective in countering oral calculus, as demonstrated by determinations made with artificial calculus deposits and with animal studies. Such determinations are shown with the illustrative examples given below.

With regard to concentration of a polyelectrolyte in the compositions of this invention, a minor proportion of from about 1 to about 8, and preferably 2 to 5, percent by weight is used.

The active ingredients described above are used in any preparation, as hereinafter described and claimed, designed for application to the oral cavity, which preparations are preferred to herein as dental preparations. Such dental preparations include suitable toothpastes and dental creams, tooth powders, lozenges, tablets, chewing gum, dental floss and the like.

Suitable, practically water-insoluble polishing agents can be admixed with active ingredients described above, in the preparation of the dentrifice compositions such as tooth powders, pastes, creams, and the like. There is a relatively large number of such materials known in the art. Representative materials include, for example, insoluble sodium metaphosphate, hydrated alumina, bentonite, etc. including suitable mixtures thereof. In general, these polishing agents will comprise a major proportion by weight of the solid ingredients. The polishing agent content is variable, but will generally be up to about 95% by weight of the total composition. In the case of a dental cream such polishing agents will generally be about 20–75% whereas in tooth powders, the polishing agents will usually be in greater proportion, such as about 70–95%.

In the preparation of tooth powders, it is usually sufficient to mechanically admix the various solid ingredients.

In dental cream formulations, the liquid and solids should necessarily be proportioned to form a creamy mass of desired consistency which is extrudable from a collapsible aluminum or lead tube. In general, the liquids in the dental cream will comprise chiefly water, glycerine, sorbitol, propylene glycol, etc., including suitable mixtures thereof. It is advantageous usually to use a mixture of both water and a humectant or binder such as glycerine or sorbitol. The total liquid content will generally be about 20–75% by weight of the formulation. It is preferred to use also a gelling agent in dental creams such as the natural and synthetic gums and gum-like materials, e.g., Irish moss, gum tragacanth, sodium carboxymethylcellulose, polyvinylpyrrolidone, starch, and the like, usually in an amount up to about 10%, and preferably about 0.5–5% of the formulation. A gelling agent need not be included, or can be used in smaller amounts in compositions containing certain polyelectrolytes; for example, a hydrolyzed copolymer of ethylene and maleic anhydride contributes to viscosity.

Mouth washes or rinses are also within the scope of the present invention. Such products are usually an effective amount of an agent or agents as described above, dissolved or dispersed in a suitable, flavored, liquid vehicle. Any suitable amount, such as up to about 3 percent of an active ingredient can be used. Liquid dentrifices are also included; such products can contain a minor amount of active ingredient, usually dissolved or dispersed in an aqueous vehicle, containing a mucilaginous material and preferably combined with small amounts of polishing agent, glycerine, coloring and flavoring materials.

Various adjuvent materials can be incorporated in such dental preparations. Added materials in the formulation which do not substantially adversely effect the properties and characteristics can be suitably selected and used in proper amount depending upon the particular type of preparation. Such materials may be used as soluble saccharin, flavoring oils (e.g., oils of spearmint, peppermint, wintergreen), coloring or whitening agents (e.g., titanium dioxide), preservatives (e.g., sodium benzoate, etc.), menthol, and the like. Various other materials can be added such as higher fatty acid amides of amino carboxylic acid compounds, e.g., sodium lauroyl and palmitoyl sarcosides. Other suitable materials are chlorophyllin and various ammoniated ingredients, such as urea, diammonium phosphate and mixtures thereof.

Activated attapulgite such as described in U.S. Patent No. 3,041,238 can also be used in the polyelectrolyte-containing compositions of this invention.

In the case of chewing gum and other products, the active ingredients can be incorporated in any suitable manner during the usual manufacture of the product. For example, they can be incorporated in a warm gum base with stirring to distribute the same uniformly therein. They can also be added to the exterior or outer surfaces of a gum base in order to coat the base. The usual gum bases can be used, representative materials being jelutong, rubber latex, vinylite resins, etc., in addition to other usual materials such as plasticizers or softeners, sugar or other suitable carbohydrates such as glucose, sorbitol, etc.

Other indicated types of compositions will be formulated in known manner also.

Broadly, then, the active ingredients described above can be employed in admixture with a carrier or vehicle of any suitable form, such as a solid, liquid or semisolid carrier.

It is to be understood that the apparent calcium complex dissociation constants are expressed as $$pK_{Ca} = -\log K_{Ca}$$

with a complex being taken as one calcium per carboxyl pair or per two equivalents of sulfonate or the like. Larger values of $pK_{Ca}$ correspond to a lower extent of dissociation, and lower values to a higher extent of dissociation. Thus, the apparent $$K = \frac{(Ca^{++})(A^{-2})}{Y}$$

wherein $(Ca^{++})$ = concentration of calcium ions,
$(A^{-2})$ = concentration of a polyelectrolyte (ligand) per two carboxyl groups or per two equivalents, and
$Y$ = concentration of a complex formed.

The constants can be calculated from photoelectric turbidimetric measurements and also by displacement of hydrogen ion by calcium chloride in titration of a polyelectrolyte with tetramethyl ammonium hydroxide as described in the text "Organic Sequestering Agents," of Chaberek and Martell; John Wiley, 1959.

The influences of pH on the calcium sequestration of a hydrolyzed copolymer of ethylene and maleic anhydride (HEMA), was determined and apparent $pK_{Ca}$ values were calculated from pH values. In making such calculations, the $pK_{Ca}$ values are given as those which would be obtained under conditions where only calcium is bound to the ligand, without competition from the other cations. Results are shown in Table I, following.

Table I.—Effect of pH on calcium sequestration by HEMA

| pH | Apparent $-\log K$ |
|---|---|
| 6.0 | 2.7 |
| 6.5 | 2.8 |
| 8 | 3.2 |
| 10.8 | 4.4 |

The present invention is more fully described and exemplified in the following examples. It is to be understood, however, that the invention is not to be limited to any specific form of materials or conditions set forth in the examples, but is limited solely by the description in the specification and the appended claims. All parts are by weight unless otherwise specified.

EXAMPLE 1

The effect of the polyelectrolytes of this invention in countering artificial calculus deposits is shown by the following in vitro test data.

Glass slides were passed mechanically through pooled stimulated saliva containing monocalcium phosphate in a concentration of 0.1 percent by weight, and air, at a rate of once every two minutes for three hours. During this time interval, simulated or artificial calculus deposits were formed. These in vitro calculus deposits are similar to oral calculus deposits in composition and in X-ray diffraction pattern. The stimulated saliva was obtained by having a group of people chew paraffin wax; the resulting saliva was pooled.

The slides containing the deposits were then passed through a water solution containing a minor percentage of a polyelectrolyte, with the initial pH of the water solution adjusted to 6.0 with either HCl or NaOH solution. Five milliliters of the pH-adjusted solution is used with 15 ml. of the saliva to provide a test sample of 20 mls. After passing a glass slide containing the deposits mechanically through the solution at a rate of 7 times per minute for 30 minutes, removal of the deposits from the slide was appraised visually.

A qualitative rating of 4 or 4+ signifies that a slide is covered with deposits, and the deposits remained on the slide when so passed through control water or water solution containing a polyelectrolyte. Thus, this is little or no removal of deposits. Successively better ratings are designated 3 (poor), 2 (good) and 1 (excellent). The last value denotes substantially complete removal of deposits. A rating of 1— is indicative of a very good deposit removal. A zero value indicates that a slide is free of deposits.

The polyelectrolyte used in the tests was a hydrolyzed copolymer of ethylene and maleic anhydride, having an average molecular weight of 1,500. It is referred to, for convenience, as HEMA.

Results of such tests are provided in Table II below.

TABLE II

| Polyelectrolyte added | Conc., mgms./20 mls. | pH final | Deposit grading | |
|---|---|---|---|---|
| | | | After 3 hours (½ r.p.m.) | After ½ hour (7 r.p.m.) |
| Control | | 7.3 | +4 | +3–+4 |
| HEMA | 5 | 7.1 | 0–+1 | 0–+1 |
| HEMA | 10 | 7.2 | 0 | 0 |
| Control | | 7.8 | +4 | +3–+4 |
| HEMA | 20 | 6.8 | 0–+1 | 0 |

Results shown in Table II reveal that HEMA is extremely effective when used at concentrations of 0.025, 0.05 and 0.1 gram per 100 milliliters.

EXAMPLE 2

Tests similar to those shown in Example 1, above, were made with a sodium polyethylene sulfonate having an average molecular weight of 250,000 and a sodium content of 17.7 percent by weight. This polyelectrolyte is effective in reducing calculus when used in a concentration of 0.5 gram per 100 milliliters, at a pH of 7.0.

EXAMPLE 3

A decrease in vivo calculus formation was observed when HEMA was supplied in drinking water given to rats. The solution was drunk ad libitim by the rats for a period of 5 days. Each rat weighed about 100 grams and was a male, Sprague Dawley type. A group of corresponding control rats were given drinking water free of polyelectrolyte under the same conditions. Results are shown in Table III.

TABLE III

| Drinking solution | Quantity, ml./rat/day | Score | Deposit reduction, percent |
|---|---|---|---|
| (Control-H₂O) | 13.7 | 12.6±8.1 | |
| 1% HEMA | 11.6 | 4.1±5.1 | 68 |

Data furnished in Table III indicate the substantial reduction of calculus formation realized with HEMA.

While the invention has been described in detail according to preferred compositions and preferred conditions for using the same, it will be obvious to those skilled in the art that changes and modifications can be made, without departing from the spirit or scope of the invention, and it is intended in the appended claims to cover such changes and modifications.

I claim:

1. A dental preparation comprising a water-insoluble polishing agent and from about 1% to about 8% by weight of said dental preparation of an agent capable of countering oral calculus, said agent being substantially linear, polymeric, water-soluble polyelectrolyte selected from the group consisting of a hydrolyzed copolymer of ethylene and maleic acid having an average molecular weight of about 1,500 and greater and a polyethylene sulfonate having an average molecular weight of about 10,000 and greater; said agent being characterized by an apparent dissociation constant upon complexing with calcium ($pK_{Ca}$) where $-\log K_{Ca}$ is from about 2.2 to about 4.5.

2. A dental preparation defined by claim 1 wherein said agent is a sodium polyethylene sulfonate having an average molecular weight of about 250,000.

3. A dental preparation defined by claim 1 wherein said agent is a hydrolyzed copolymer of ethylene and maleic anhydride having an average molecular weight of about 1,500.

4. A dental preparation defined by claim 3 in the form of a dental cream.

5. The method of countering oral calculus, which comprises: applying a dental preparation containing about 1 to about 8% of an agent as defined in claim 1 to the oral cavity.

References Cited

UNITED STATES PATENTS 2,798,053 7/1957 Brown _____ 167—93 X
3,132,075 5/1964 Johnson _____ 167—82

OTHER REFERENCES

Hoffman et al.: Journal of Periodontology, vol. 34, pp. 344–347, July 1963.

Scopp, New York Journal of Dentistry, vol. 28, p. 65, February 1958.

RICHARD L. HUFF, *Primary Examiner.*